United States Patent Office 3,834,913
Patented Sept. 10, 1974

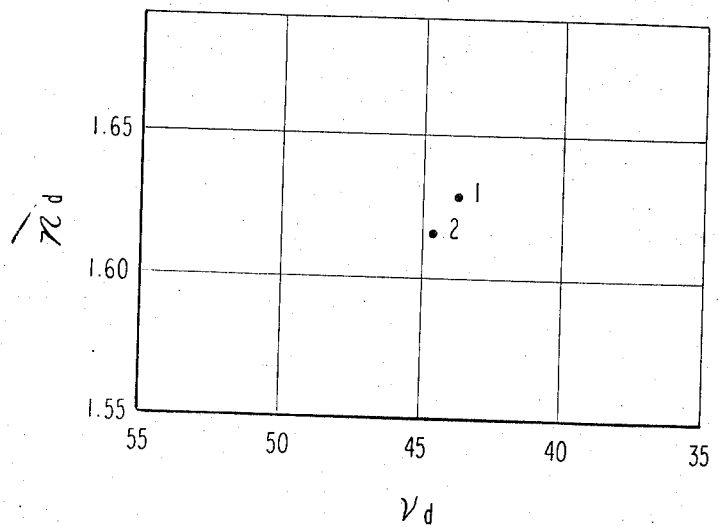

3,834,913
ABNORMAL DISPERSION GLASS EXHIBITING THE ABNORMAL PARTIAL DISPERSION IN THE INFRARED REGION
Yoshiyuki Asahara, Kawasaki, and Tetsuro Izumitani, Tokyo, Japan, assignors to Hoya Glass Works, Ltd., Tokyo, Japan
Filed July 10, 1972, Ser. No. 270,403
Claims priority, application Japan, July 8, 1971, 46/50,505
Int. Cl. C03c 3/04, 3/10, 3/30
U.S. Cl. 106—53                                     2 Claims

ABSTRACT OF THE DISCLOSURE

This invention provides an abnormal dispersion glass exhibiting the abnormal partial dispersion in the infrared region. This abnormal dispersion glass has a small Abbe number and favorable acid resistance, and is composed of $B_2O_3$ 54 to 60 mol. percent, PbO 7 to 12 mol. percent, $Al_2O_3$ 8 to 14 mol. percent, CaO 8 to 15 mol. percent, $ZrO_2$ 0 to 1.5 mol. percent, $TiO_2$ 1.5 to 4.0 mol. percent and $SiO_2$ 4 to 11 mol. percent.

BACKGROUND OF THE INVENTION

1. Field of the Invention

This invention relates to an abnormal dispersion glass exhibiting the abnormal partial dispersion in the infrared region, having a small Abbe number and being quite resistant to attack of acids.

2. Description of the Prior Art

In the known flint and crown glasses, there is the following linear relation (2) between the partial dispersion ratio ($P_{xy}$) and the Abbe number ($\nu_d$), if it is assumed that the partial dispersion ratio $P_{xy}$ with respect to mutually different wave lengths $x$ and $y$ is represented by equation (1).

$$\nu_d = n_d - 1/n_F - n_o$$

$$P_{xy} = \frac{n_x - n_y}{n_F - n_o} \quad (1)$$

$$P_{xy} = a_{xy} + b_{xy}\nu_d = \tilde{P}_{xy} \quad (2)$$

wherein $\tilde{P}_{xy}$ is the partial dispersion ratio for the known flint and crown glass, $n_x$ and $n_y$ are respectively the refractive indexes with respect to lights having more length $x$ and $y$, $a_{xy}$ and $b_{xy}$ are the constants changing with the magnitude of the wave length of X and Y, respectively.

In order to design and produce a super achromatic lens assembly capable of extinguishing the secondary spectrum, at least one lens having the partial dispersion ratio $P_{xy}$ deviating from the above formula (2), must be used. This means that at least one lens whose $\Delta P_{xy}$ is not zero must be used, assuming that the partial dispersion ratio $P_{xy}$ of the glass is shown by following relation;

$$P_{xy} = \tilde{P}_{xy} + \Delta P_{xy} \quad (3)$$

The favorable super achromatic lens has a higher $\Delta P_{xy}$ value. The special Kurtz flint glass is already known having a refractive index ($n_d$) and the Abbe number ($\nu_d$) comparable with that of the usual flint glass, and having a large partial dispersion ratio ($P_{ct}$) to the C line and $t$ line in the infrared region. This means that the $\Delta P_{ct}$ of the Kurtz flint glass is larger than zero. For example, the usual flint glass has a $P_{ct}$ value of 0.7551 with a $n_d$ of 1.61340 and a $\nu_d$ of 44.30, whereas the Kurtz flint glass has a $P_{ct}$ value of 0.7956. This Kurtz flint glass, however, has a very poor acid resistance since it is composed primarily of PbO—$B_2O_3$.

In a test for the resistance of the glass to acidic attack comprising sampling a 28–35 mesh glass powder (specific gravity gram) in a P$t$ cage, dipping the P$t$ cage for 1 hr. in a 150 cc. of 1/100N $HNO_3$ solution kept at above 99° C. using boiling water, then drying the powder, and measuring the weight loss (percent) of the glass powder, the Kurtz flint glass showed a weight loss of greater than 4.0% by weight, whereas the usual flint or crown glass shows a weight loss of less than 2.0%. This means that the Kurtz flint glass had a poor resistance to acid attack.

On the other hand, the difference between the Abbe number of the concave lens and that of the convex lens, both lenses being assembled to minimize achromatic aberration, may be as large as possible not only to remove the secondary spectrum but also to remove the spherical aberration. Therefore, the abnormal dispersion flint glass for the concave lens must have a small $n_d$ value and also a small Abbe number.

The inventors have already invented a PbO—$B_2O_3$—$Al_2O_3$ glass incorporating CaO or $ZrO_2$, as Japanese Patent Application 69533/'70, which exhibited excellent resistance to acid attack. It is an object of this invention to improve further the acid resistance of such a glass.

SUMMARY OF THE INVENTION

This invention provides an abnormal dispersion glass exhibiting the abnormal partial dispersion in the infrared region, having a small Abbe number and favorable acid resistance which is composed of $B_2O_3$ 54 to 60 mol. percent, PbO 7 to 12 mol. percent, $Al_2O_3$ 8 to 14 mol. percent, CaO 8 to 15 mol. percent, $ZrO_2$ 0 to 1.5 mol. percent, $TiO_2$ 1.5 to 4.0 mol. percent and $SiO_2$ 4 to 11 mol. percent.

BRIEF DESCRIPTION OF THE ACCOMPANYING DRAWING

In the drawing the relationship between the $\nu_d$ value and the $n_d$ value of a glass of the invention is shown.

DETAILED DESCRIPTION OF THE INVENTION

This invention is based on the discovery that the introduction of both $TiO_2$ 1.5–4.0 mol. percent and $SiO_2$ 4.0–11 mol. percent to an acid resistant glass composed of $B_2O_3$ 54–60 mol. percent, PbO 7–12 mol. percent, $Al_2O_3$ 8–14 mol. percent and $ZrO_2$ 0–1.5 mol. percent was very effective to reduce the $\nu_d$ value, to improve the acid resistance additionally and to produce a lens suitable for removing spherical aberration.

Preferred ranges of the above components of the glass composition of this invention are; $B_2O_3$ 54 to 58 mol. percent, PbO 8 to 10 mol. percent, $Al_2O_3$ 11 to 13 mol. percent, CaO 9 to 11 mol. percent, $ZrO_2$ 0.5 to 1.5 mol. percent, $TiO_2$ 2.5 to 3.5 mol. percent and $SiO_2$ 8 to 10%.

Now, some examples of this invention and comparative examples will be described with reference to Table 1 and Table 2, and a drawing which shows the relation between the $\nu_d$ value and the $n_d$ value of the glasses of this invention.

TABLE 1

| Specimen number | Composition (mol. percent) | | | | | | |
|---|---|---|---|---|---|---|---|
| | $B_2O_3$ | $Al_2O_3$ | PbO | CaO | $ZrO_2$ | $TiO_2$ | $SiO_2$ |
| 1 | 58.0 | 10.0 | 10.0 | 14.0 | | 3.0 | 5.0 |
| 2 | 56.0 | 12.0 | 9.0 | 10.0 | 1.0 | 3.0 | 9.0 |
| 3* | 70.0 | 10.0 | 15.0 | 5.0 | | | |
| 4* | 66.0 | 10.0 | 15.0 | 5.0 | | | 4.0 |
| 5* | 64.0 | 10.0 | 15.0 | 5.0 | | | 6.0 |
| 6* | 60.0 | 15.0 | 10.0 | 10.0 | | | 5.0 |
| 7* | 55.0 | 15.0 | 10.0 | 10.0 | | | 10.0 |
| 8* | 65.0 | 12.0 | 9.0 | 10.0 | 1.0 | 3.0 | |

*Comparative examples of conventional glass compositions.

TABLE 2

| Specimen number | $\eta_d$ | $\nu_d$ | $P_{ig}$ | $P_{gf}$ | $P_{ct}$ | $D_a^1$ | $\rho^2$ |
|---|---|---|---|---|---|---|---|
| 1 | 1.62815 | 43.77 | | | | 2.00 | 3.04 |
| 2 | 1.61463 | 44.58 | 1.3347 | 0.5639 | 0.8011 | 1.59 | 2.89 |
| 3* | 1.61662 | 44.74 | | 0.5501 | 0.8149 | 2.55 | 3.14 |
| 4* | 1.61516 | 44.77 | | | | 3.97 | 3.15 |
| 5* | 1.61442 | 44.68 | | | | 4.52 | 3.15 |
| 6* | 1.59689 | 48.33 | | | | 2.51 | 2.93 |
| 7* | 1.59702 | 48.14 | | | | 2.62 | 2.93 |
| 8* | 1.61523 | 45.09 | 1.3324 | 0.5631 | 0.8136 | 2.66 | 2.98 |

[1] $D_a$ shows the weight loss (percent) of the glass powder subjected to the 1/100 N HNO₃ solution described hereinbefore.
[2] P Shows the density (g./cc.) of the glass.

*Comparative examples of conventional glass compositions.

The above table shows the following things. The single addition of TiO₂ to the glass of Japanese Patent Application 69533/'70 improves the acid resistance to some extent surpassing that of the conventional Kurtz flint glass, but the $D_a$ value is not reduced below 2.00%, as observed in Specimen 8. The single addition of the SiO₂ to the glass according to the Japanese Patent Application is detrimental to the improvement of the acid resistance, as observed in the Specimens 4, 5, 6 and 7.

The addition of both TiO₂ and SiO₂ to the glass of the Japanese Patent Application brings out a low refractive index, a low Abbe number and excellent acid resistance with a $D_a$ value not above 2.00, as shown in the Specimens 1 and 2, whereas the acid resistance of conventional glasses having the same refractive index and the Abbe number as specimen 1 and 2 (Specimens 3, 5, 8) are not so good.

In the drawing, the relation between the $\nu_d$ value and the $n_d$ value of the glass of this invention (Specimen 1 and 2) is shown as points 1 and 2.

The above restricted ranges of the contents of PbO₂, B₂O₃, Al₂O₃, CaO and ZrO₂ are suitable for producing a stable and acid resistant glass and impart the abnormal partial dispersion in the infrared region to the glass.

Less than 1.5% of TiO₂ is ineffective to reduce the Abbe number of the glass, whereas more than 4.0% of TiO₂ facilitates the formation of a devitrifying glass.

More than 11.0% of SiO₂ extinguishes the anomaly of the partial dispersion of the glass in the infrared region, whereas less than 4.0% of the SiO₂ is almost ineffective to improve the acid resistance of the glass.

The glass having the above composition exhibits the remarkable anomaly of the partial dispersion in the infrared region but exhibits the low partial dispersion ratio $P_{ig}$ in the ultrared region as compared with the usual flint glass. For example, Specimen 2 of this invention has a $P_{ct}$ value of 0.8011, a $P_{ig}$ value of 1.3347 and a $P_{gF}$ value of 0.5639, whereas the usual flint glass having the same Abbe number has a $P_{ct}$ value of 0.7564, a $P_{gF}$ value of 0.5688 and a $P_{ig}$ value of 1.3504, determined by the aforesaid expression (2).

The optical glass of this convention can be prepared by melting a mixture of the above described components in a platinum crucible at a temperature of 1300 to 1400° C., refining the melt, casting the glass in a desired form and cooling to room temperature.

While this invention has been described with reference to particular embodiments thereof, it will be understood that numerous modifications may be made by those skilled in the art without actually departing from the scope of the invention.

Therefore, the appended claims are intended to cover all such equivalent variations as coming within the true spirit and scope of this invention.

What is claimed is:

1. An abnormal dispersion glass exhibiting partial dispersion in the infrared region, having a low Abbe number and an acid resistance $D_a$ value not above 2.00, and composed of B₂O₃ 54 to 60 mol. percent, PbO 7 to 12 mol. percent, Al₂O₃ 8 to 14 mol. percent, CaO 8 to 15 mol. percent, ZrO₂ 0 to 1.5 mol. percent, TiO₂ 1.5 to 4.0 mol. percent and SiO₂ 4 to 11 mol. percent.

2. The abnormal dispersion glass of Claim 1, wherein said glass is composed of B₂O₃ 54 to 58 mol. percent, PbO 8 to 10 mol. percent, Al₂O₃ 11 to 13 mol. percent, CaO 9 to 11 mol. percent, ZrO₂ 0.5 to 1.5 mol. percent, TiO₂ 2.5 to 3.5 mol. percent, and SiO₂ 8 to 10 mol. percent.

References Cited

UNITED STATES PATENTS 3,480,453  11/1969  Reid et al.  106—53

OTHER REFERENCES

Volf, M. B.: *Technical Glasses*, Sir Isaac Pitman and Sons Ltd., London, 1961, pp. 35, 38, 157.

*Ceramic Industry*, January 1967, Handbook of Materials for Ceramic Processing, pp. 137–140 in particular col. 1, page 140.

ALLEN B. CURTIS, Primary Examiner

M. L. BELL, Assistant Examiner